United States Patent
Baird et al.

(10) Patent No.: US 7,922,272 B2
(45) Date of Patent: Apr. 12, 2011

(54) METHOD FOR APPLICATION AND ACCURATE POSITIONING OF GRAPHICS ON A SURFACE

(75) Inventors: Richard W. Baird, Covington, WA (US); James N. Buttrick, Seattle, WA (US); Glenn R. Dalby, Shoreline, WA (US); Silas L. Studley, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 12/101,854

(22) Filed: Apr. 11, 2008

(65) Prior Publication Data

US 2009/0257070 A1 Oct. 15, 2009

(51) Int. Cl.
*B41J 3/407* (2006.01)
*B05B 13/04* (2006.01)
*B41J 3/36* (2006.01)

(52) U.S. Cl. ............... 347/2; 347/37; 347/109; 118/305

(58) Field of Classification Search ............. 347/2, 109; 118/305; 114/222
See application file for complete search history.

(56) References Cited

U.S. PATENT DOCUMENTS

| | | | |
|---|---|---|---|
| 4,401,699 A | | 8/1983 | Baskett |
| 5,090,354 A | * | 2/1992 | Fereretti ................. 118/505 |
| 6,096,132 A | * | 8/2000 | Kaiba et al. ............ 118/680 |
| 6,341,831 B1 | * | 1/2002 | Weber et al. ............... 347/2 |
| 6,467,385 B1 | | 10/2002 | Buttrick et al. |
| 6,467,978 B1 | * | 10/2002 | Tideman, Jr. .............. 400/76 |
| 6,722,447 B2 | | 4/2004 | Stepan et al. |
| 6,843,328 B2 | | 1/2005 | Boyl-Davis et al. |
| 6,905,291 B2 | | 6/2005 | Day et al. |
| 6,926,094 B2 | | 8/2005 | Arntson et al. |
| 6,927,560 B2 | | 8/2005 | Pedigo et al. |
| 6,951,375 B2 | * | 10/2005 | Patton et al. ................. 347/3 |
| 6,953,298 B2 | * | 10/2005 | Healy ..................... 118/207 |
| H2159 H | * | 7/2006 | McGoldrick .............. 118/305 |
| 7,350,890 B2 | | 4/2008 | Baird et al. |
| 7,815,305 B2 | * | 10/2010 | Bergman et al. .......... 347/109 |
| 2002/0024544 A1 | | 2/2002 | Codos |
| 2003/0212489 A1 | | 11/2003 | Georgeson et al. |
| 2004/0088843 A1 | | 5/2004 | Day et al. |
| 2004/0099684 A1 | | 5/2004 | Day et al. |
| 2004/0141784 A1 | * | 7/2004 | Patton et al. ............... 400/323 |
| 2004/0265077 A1 | | 12/2004 | Boyl-Davis et al. |
| 2004/0265078 A1 | | 12/2004 | Boyl-Davis et al. |

(Continued)

FOREIGN PATENT DOCUMENTS

DE 19634582 3/1998

(Continued)

OTHER PUBLICATIONS

Extended European Search Report pursuant to Rule 62 EPC, Aug. 25, 2009, European Patent Office.

*Primary Examiner* — Matthew Luu
*Assistant Examiner* — Shelby Fidler

(57) ABSTRACT

There is provided a method of applying an accurately positioning at least one graphic image on a large contoured surface using an apparatus comprising a flexible-rail positioning system mounted on a portion of the surface on which the graphic image is to be applied, a graphic image application system, software to operate the positioning system, and software to operate the graphic image application system.

22 Claims, 4 Drawing Sheets

U.S. PATENT DOCUMENTS

| | | |
|---|---|---|
| 2004/0265081 A1 | 12/2004 | Buttrick, Jr. |
| 2005/0052898 A1 | 3/2005 | Arntson |
| 2005/0132560 A1 | 6/2005 | Jones et al. |
| 2005/0251985 A1 | 11/2005 | Arntson et al. |
| 2005/0263949 A1 | 12/2005 | Boyl-Davis et al. |
| 2005/0265798 A1 | 12/2005 | Boyl-Davis et al. |
| 2006/0044376 A1 | 3/2006 | Baird et al. |
| 2006/0068109 A1 | 3/2006 | Frankenberger et al. |

FOREIGN PATENT DOCUMENTS

| | | |
|---|---|---|
| EP | 0108683 | 5/1984 |
| WO | 03/049899 | 6/2003 |

* cited by examiner

FIG. 3
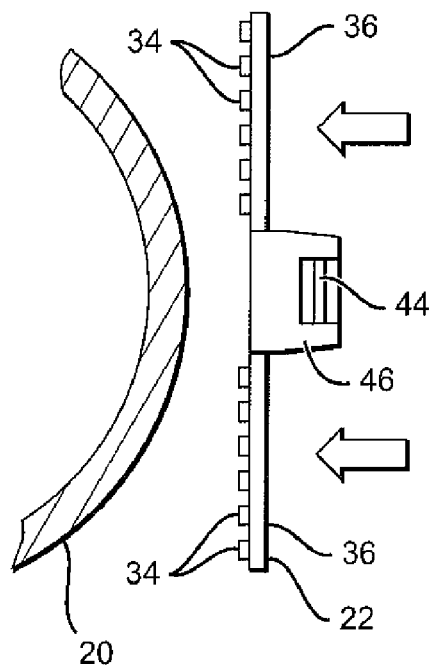
FIG. 4
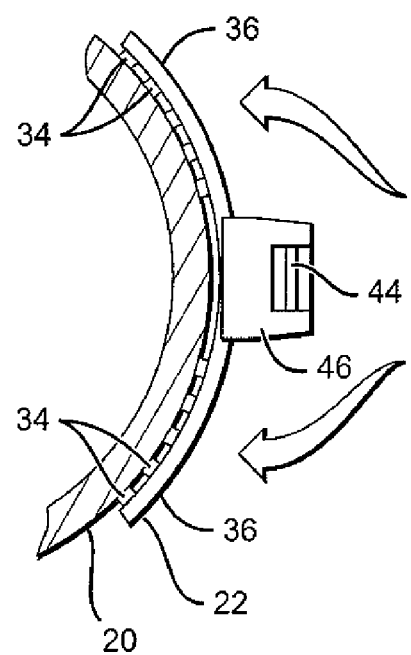
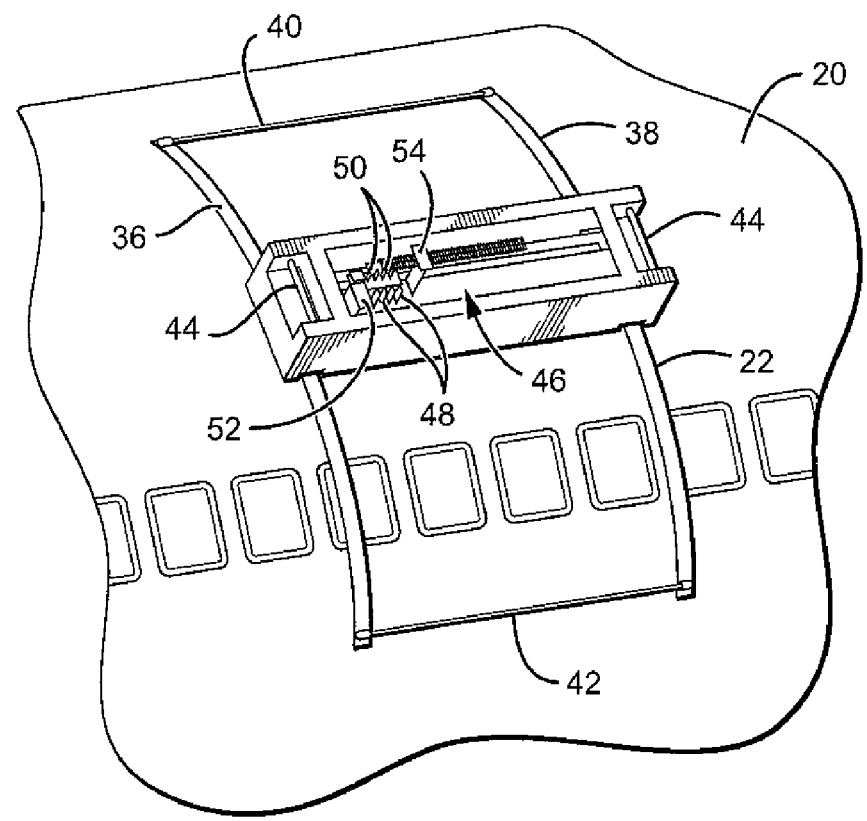
FIG. 5

METHOD FOR APPLICATION AND ACCURATE POSITIONING OF GRAPHICS ON A SURFACE

BACKGROUND OF THE INVENTION

1) Field of the Invention

An apparatus and method for application and accurate positioning of graphics on a surface is provided. More particularly, an apparatus and method for application and accurate positioning of graphics and for accurate positioning of a graphics application device on a contoured surface is provided.

2) Description of Related Art

For various commercial products, it is desirable to apply colorful visual graphics through the application of a pigmented formulation to a surface to form an aesthetically pleasing image. The graphics may be applied to the surface by various known methods, including applying a paint material to the surface by means of a brush or a spray. Other known methods may be used that do not use painting processes. Such methods may include adhering to a surface an applique or decal having the desired graphics or images formed thereon.

The foregoing known methods have been used to apply visual graphics to an exterior portion of an aircraft. For example, graphic images may be applied to fuselage, tail, rudder, and wing surfaces of an aircraft for decorative and/or functional purposes. However, complex graphics application to an exterior aircraft surface is often a slow and costly process. Since the graphics and images are often large and detailed, skilled personnel are required to paint or adhere the graphics or images to an exterior surface of the aircraft, which increases the production cost of the aircraft due to the additional labor cost associated with painting or adhering the graphics or images.

Known methods of painting are limited in the intricacy and complexity of the graphics and images that are practical to apply. For example, a difficulty with known methods of painting is producing photo-realistic images on aircraft. In addition, another difficulty with known methods of painting is that the application and drying is time consuming. Paint layers are generally successively applied to the surface of the aircraft and a time consuming drying period is required between successive paint applications, thus increasing the production time for the aircraft. Moreover, the application of decorative color layers of paint often requires the application of paint masking devices, such as tape or stencils, between successive applications of the layers, which requires more time and labor. It may take hours to apply the masking device depending on the square footage area of the aircraft to be covered. The paint is then applied and depending on the process, at some point after applying the paint, the masking device must be removed. When the paint is sufficiently dry, it may be necessary to go back over the painted image to re-mask it for another color. In addition, a difficulty with spray application devices for paint is that they may only apply a single color portion of the image, and the spray application device must be cleaned several times before the image is complete, thus requiring increased time and labor. Finally, the graphics or images applied with known methods of painting may have surface irregularities which can cause additional surface drag on the aircraft when it is in flight, thus resulting in increased fuel consumption by the aircraft.

Known methods for adhering appliques or decals having the desired graphics or images formed thereon to a surface of an aircraft can also pose problems. Decals are typically applied to the exterior surface of an aircraft with pressure-sensitive adhesives which are inherently weaker than cured (cross-linked) paint. Moreover, appliques and decals are susceptible to premature degradation through prolonged exposure to ultraviolet radiation that results in fading and/or discoloration of the graphics or images. In addition, appliques and decals may partially detach from the aircraft surface, particularly along exposed edges of the appliques or decals, thus increasing the maintenance costs for the aircraft.

Known methods and systems for positioning graphics or images on surfaces, as well as positioning graphics devices on surfaces, are also known. However, such methods and systems have curvature constraints with respect to positioning the graphics and/or graphics devices on various types of highly contoured or curved surfaces, and they have limitations with the proportion or amount of a curved surface, such as an aircraft surface, on which the graphics and/or graphics devices can be accurately positioned and applied. Moreover, they are limited in the maximum square footage area to which graphics may be applied before they must be repositioned on the surface receiving the graphics. In addition, typical methods of positioning a system for this purpose can require the use of additional machinery such as a five axis machine.

Accordingly, there is a need for an apparatus and method for application and accurate positioning of graphics and a graphics positioning device on a surface that does not have the problems associated with known devices and methods.

SUMMARY OF THE INVENTION

This need for an apparatus and method for application and accurate positioning of graphics and a graphics positioning device on a surface that does not have the problems associated with known devices and methods, as well as a unique, nonobvious, and advantageous apparatus and method, is satisfied. None of the known devices and methods provide all of the numerous advantages discussed herein. Unlike known devices and methods, an embodiment of the apparatus and method for application and accurate positioning of graphics and a graphics positioning device on a surface may provide one or more of the following advantages: the method is faster than known methods and may be 2-3 times, or more, faster than adhesive methods; the method provides for decreased labor costs, does not require masking, de-masking, or re-masking steps, and is accurate with very fast curing; the method and apparatus provide a better finish quality, greater durability and more artistic flexibility and complexity compared to known methods and devices; the method and apparatus provide a positioning system to accurately position the graphics and graphics positioning apparatus on large surface areas that may have approximately cylindrical curvature and contours, as well as offset from or raised above such large surface areas; the method and apparatus enables efficient application of graphics over approximately 80% of an aircraft exterior that is considered decorative, such as the fuselage, vertical tail, rudder, and wings; the method and apparatus provide for graphics and images in a digitalized, electronic form until actually applied to the aircraft, thus enabling easily made last minute changes; the method and apparatus provide the integration of a graphics application device and a precision positioning system, which together can be used to apply complex graphics or images to a contoured surface; and, the method and apparatus of the invention may be used with aircraft, rotorcraft, vehicles such as automobiles and trucks, watercraft such as boats and ships, and various other applications for which application of graphic images to large contoured surfaces is desired.

In an embodiment of the invention, there is provided an apparatus for application and accurate positioning of at least one graphic image on a large contoured surface, comprising: a flexible-rail positioning system mounted on a portion of the surface on which the graphic image is to be applied; a graphic image application system; software to operate the positioning system; and, software to operate the graphic image application system.

In another embodiment of the invention, there is provided a method of applying and accurately positioning at least one graphic image on a large contoured surface, comprising the steps of: connecting a flexible-rail positioning system with an attached paint application system to a portion of the surface to be painted or decorated; identifying reference marks on the portion of the surface to be painted or decorated; aligning the paint application system to the reference marks on the portion of the surface to be painted or decorated; aligning a selected segment of the graphic image to be applied to the reference marks on the portion of the surface to be painted or decorated; applying the selected segment of the graphic image by moving the paint application system along the portion of the surface to be painted or decorated using a flexible rail; and, detaching the flexible-rail positioning system after the graphic image is applied, and moving the flexible-rail positioning system to another portion of the surface.

In another embodiment of the invention, there is provided a method of accurately applying and positioning a graphic image on an exterior surface of an aircraft, comprising the steps of connecting a flexible-rail positioning system with an attached graphic image application system to a portion of the surface; identifying reference marks on the portion of the surface; aligning the graphic image application system to the reference marks on the portion of the surface; aligning a selected segment of the graphic image to be applied to the reference marks on the portion of the surface; applying the selected segment of the graphic image by moving the graphic image application system along the portion of the surface using the flexible-rail positioning system, and, detaching the flexible-rail positioning system after the graphic image is applied, and moving the flexible-rail positioning system to another portion of the surface.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein:

FIG. 3 is a side view of the apparatus of the invention aligned with a large contoured exterior surface of the fuselage of an airplane;

FIG. 4 is a side view of the apparatus of FIG. 3 attached to the airplane;

FIG. 5 is a perspective view of the apparatus of the invention which is attached to a large contoured exterior surface of the fuselage of an airplane;

DETAILED DESCRIPTION OF THE INVENTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

Figure 1:
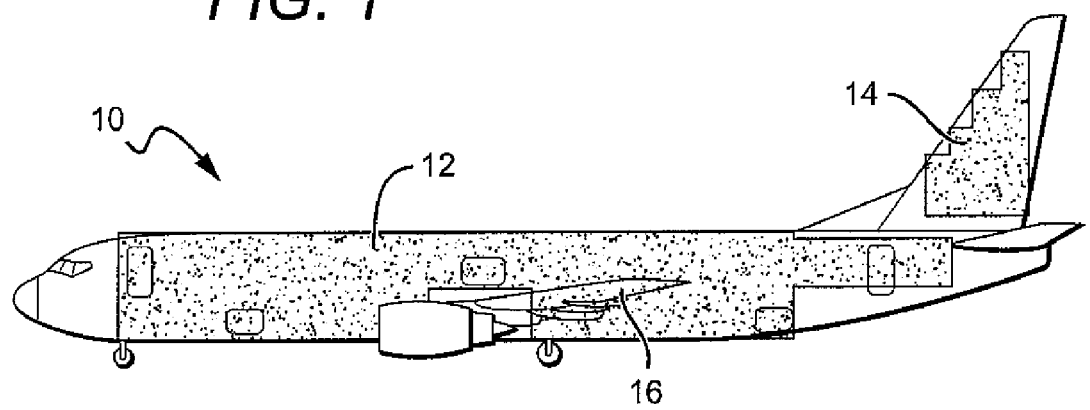
FIG. 1 is a side view of an airplane in which the shaded areas are those surfaces on which graphic images may be applied with the apparatus and method of the invention.

Referring now to the drawings, FIG. 1 is a side view of an airplane 10 in which the shaded areas are those surfaces on which graphic images may be applied with the apparatus and method of the invention. Such areas include, but are not limited to, a fuselage surface 12, a tail surface 14, and a wing surface 16. The apparatus and method of the invention may be used for applying graphic images to aircraft, rotorcraft, vehicles such as automobiles and trucks, watercraft such as boats and ships, and various other applications desiring application of graphic images to large contoured surfaces. Accordingly, one of ordinary skill in the art will recognize and appreciate that the inventive apparatus and method can be used in any number of applications requiring application of graphic images to large contoured surfaces.

Figure 2:
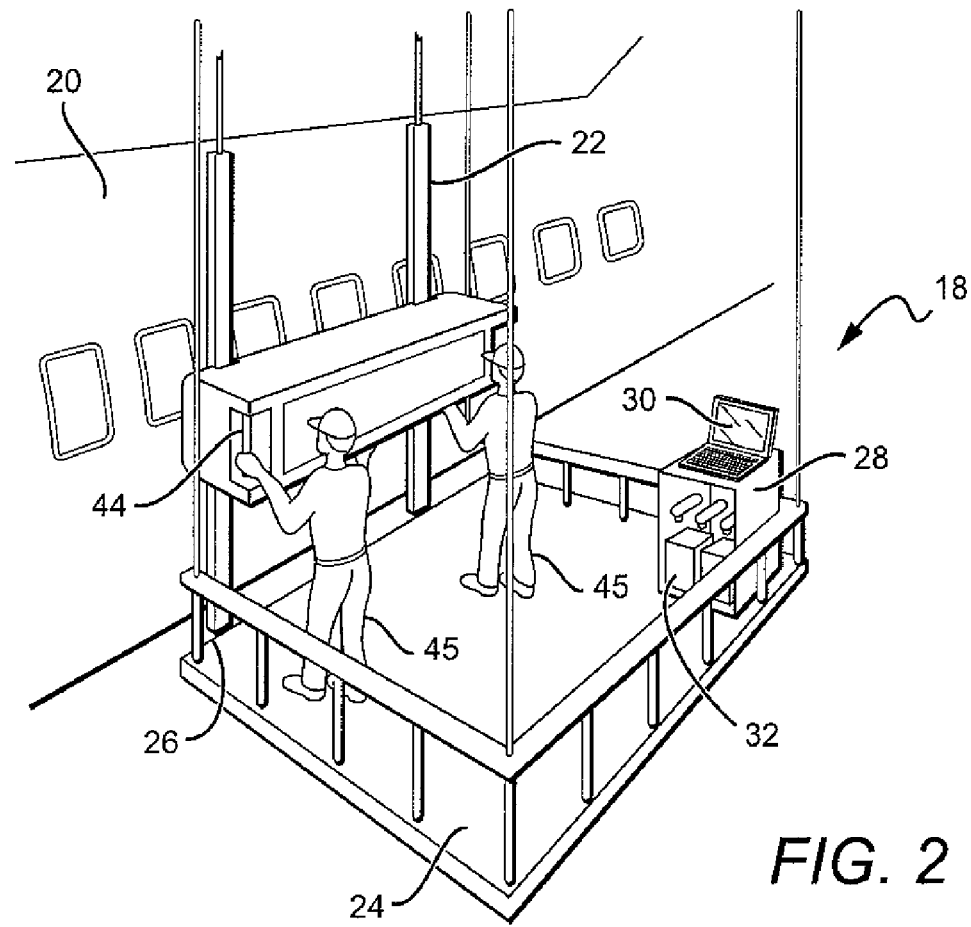
FIG. 2 is a perspective view of the apparatus of the invention on a platform prior to being positioned along a large contoured exterior surface of the fuselage of an airplane.

FIG. 2 shows a perspective view of an embodiment of an apparatus 18 of the invention prior to being positioned for application of at least one graphic image on a large contoured exterior surface 20, preferably the surface of an airplane such as the fuselage. However, any porous or non-porous surface made of any number of different materials can be used with the method and apparatus of the invention. The apparatus comprises a flexible-rail positioning system 22 to be positioned and mounted on the surface 20 on which a desired graphic image is to be applied. The flexible-rail positioning system is more fully described in the following patents and published applications, all commonly owned by applicant, and all of which are incorporated by reference in their entireties herein; U.S. Pat. No. 6,843,328 ("Flexible Track Drilling Machine"); U.S. Pub. No. 2005/0265798 ("Flexible Rail Multiaxis Machine Tool and Method"); U.S. Pub. No. 2004/0265078 ("Methods and Apparatus for Track Members Having a Neutral-Axis Rack"); and, U.S. Pat. No. 6,467,385 ("Panel Trimming System").

The flexible-rail positioning system 22 is preferably moved from one exterior surface location to another exterior surface location via a movable platform 24. The flexible-rail positioning system 22 may be positioned on an open side 26 of the platform during movement from one exterior surface location to another exterior surface location. The platform preferably includes a cabinet 28 that can hold a computer 30, bulk inks or paints 32, motor controllers (not shown), air pressure controller (not shown), data path electronics (not shown), power supplies (not shown), filters (not shown), and a nitrogen/oxygen splitter (not shown). FIG. 3 shows a side view of the apparatus of the invention aligned with the large contoured exterior surface 20 of the fuselage of an airplane. The flexible-rail positioning system 22 comprises a plurality of attachment components 34 releasably affixed at spaced intervals along the length of a first flexible rail 36. A second flexible rail 38 (see FIG. 5 and FIG. 7) is preferably parallel to and spaced apart from the first rail 36 and also has a plurality of attachment components (not shown in FIG. 5 or FIG. 7) releasably affixed at spaced intervals along the length of the second rail 38. The attachment components are spaced at intervals along each flexible rail for releasably attaching each rail to the surface of the airplane or other desired surface. The widths of the flexible rails preferably extend substantially parallel to the surface. Preferably, the attachment components 34 are in the form of vacuum suction cup assemblies. The configuration of the vacuum suction cups are designed to wrap around the curve of the surface and attach to the surface. Preferably, the vacuum suction cups are made of a material that does not damage the existing coating on the exterior surface of the aircraft. Other suitable attachment components may also be used, such as magnets for attachment to ferromagnetic surfaces, and externally mounted reconfigurable tools that force the flexible rail into a shape that matches the aircraft, such as a series of programmable actuators spaced 3-4 feet apart that are connected to the flexible track. In another embodiment, the flexible rails may be offset from or spaced above the surface of the airplane with a secondary support system (not shown) that may hold the flexible rails in the appropriate configuration above the contoured surface so that they do not contact the surface. Sensors or touch probes may also be used in connection with the secondary support system.

As shown in FIG. 5, the flexible-rail positioning system 22 further includes a first connecting member 40 and a second connecting member 42. Preferably, the rails 36, 38 are affixed to each other via the connecting members 40, 42 which fix the spacing between the rails at each respective end. However, the connecting members 40, 42 may be adjusted to allow the spacing between the rails 36, 38 to adjust. As shown in FIG. 3, the widths of the rails 36, 38 extend substantially parallel to the surface 20. FIG. 4 shows a side view of the apparatus of FIG. 3 attached to the large contoured exterior surface 20 of the fuselage of the airplane via the attachment devices 34. Preferably, the lengths of the rails 36, 38 are at least six feet but may be of a longer length as required by the graphics application process. Preferably, the rails are designed to be interlocking.

Figure 6:
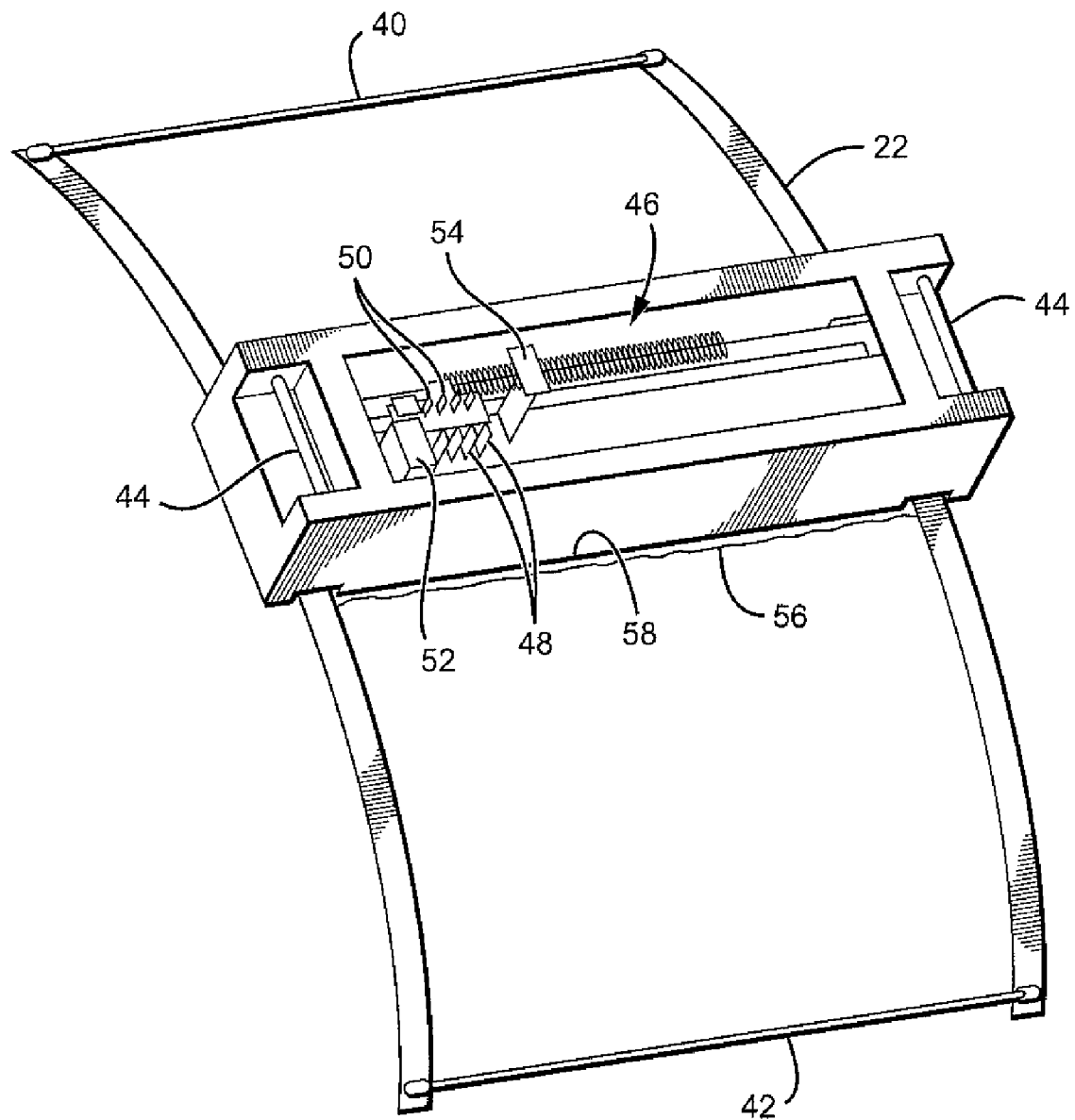
FIG. 6 is a perspective view of an embodiment of the apparatus of the invention; and, FIG. 7 is a perspective view of another embodiment of the apparatus of the invention.

The apparatus of the invention for application and accurate positioning of at least one graphic image on a large contoured surface further comprises a graphic image application system 46 (see FIGS. 2-7). FIG. 5 is a perspective view of the apparatus of the invention showing the graphic image application system 46 which is attached to the large contoured exterior surface 20 of the fuselage of an airplane. The graphic image application system 46 is more fully described in U.S. Pat. No. 7,350,890 ("Apparatus and Methods for Applying Images to a Surface"), which is commonly owned by Applicant, and which is incorporated by reference in its entirety herein. FIG. 6 is a perspective view of the apparatus of the invention showing the graphic image application system 46. The graphic image application system 46 include handles 44 (see FIGS. 2-7). Operators 45 (see FIG. 2) of the system can grip the handles 44 in order to move the system onto the platform 24 and/or along the surface 20. The graphic image application system 46 preferably comprises an ink jet printer engine having a plurality of print heads 48, ink tanks 50, UV (ultraviolet) cure lamp 52, a camera system 54 for fiducial detection, and brushes 56 (see FIG. 6 and FIG. 7) along a bottom edge 58 of the system to contain emissions from the UV curing lamp. Each print head has two data connectors. The ink tanks are motorized to maintain them in an upright position as the application system or printer moves around the circumference of the contoured surface. The UV inks are designed to jet at about 45 degrees C. The print heads are heated using water paths (not shown) built into the print head to maintain ink temperature correctly.

Figure 7:
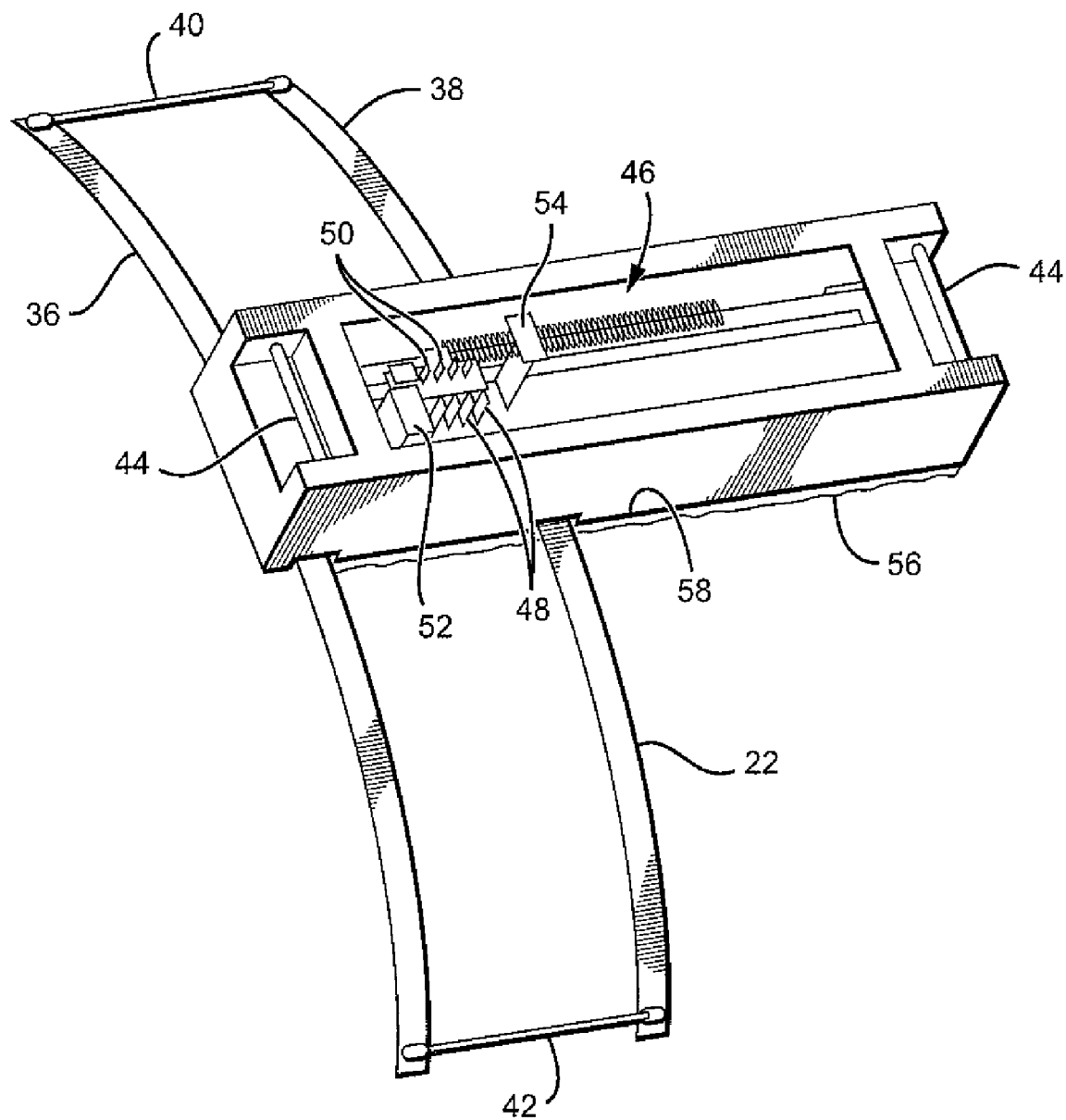

FIG. 7 is a perspective view of another embodiment of the flexible-rail positioning system 22 of the invention with the graphic image application system 46. In the embodiment shown in FIG. 7, the graphic image application system 46 is positioned so that only one end thereof is mounted to a flexible rail 36. The graphic image application system 46 is mounted to the other rail 38 at a desired point between the two ends thereof. Thus, the graphic image application system is in a cantilevered position to one side of the flexible rail positioning system 22. With the embodiment shown in FIG. 6, the graphic image application system 46 is positioned so that each end of the system thereof is mounted on one of the flexible rails 36, 38. In the embodiment shown in FIG. 7, the print heads 48 are rastered back and forth as in the embodiment shown in FIG. 6. However, such print heads 48 remain to one side of the flexible rails 36, 38 in the embodiment shown in FIG. 7. The embodiment shown in FIG. 7 provides improved access to certain areas of an aircraft, such as vertical fin to fuselage join areas, which may be difficult to access with the graphic image application system. As shown in FIG. 7, the flexible-rail positioning system 22 includes first connecting member 40 and second connecting member 42. Preferably, the rails 36, 38 are affixed to each other via the connecting members 40, 42 which fix the spacing between the rails at each respective end. However, the connecting members 40, 42 may be adjusted to allow the spacing between the rails 36, 38 to adjust. Preferably, the lengths of the rails 36, 38 are at least six feet but may be of a longer length as required by the graphics application process. Preferably, the rails are designed to be interlocking.

Other components of the graphic image application system 46 are more fully described in the U.S. Pub. No. 2006/0044376. The flexible-rail positioning system positions the graphic image application system on the contoured surface in order to apply a graphic image on the contoured surface. Thus, the graphic image application system is being positioned and moved directly to the surface on which the graphic image is to be applied. The graphic image application system may apply a durable ink and/or paint to the surface. Preferably, the durable ink or paint used is ultraviolet curable. Ultraviolet curable durable ink or paint is preferred due to its superior chemical resistance, adhesion, and durability. In addition, a full four-color digitalized image may be applied.

The apparatus of the invention for application and accurate positioning of at least one graphic image on a large contoured surface further comprises software to operate the positioning system. Such software is preferably standard operating software known in the art. The apparatus further comprises imaging software to operate the graphic image application system. Preferably, the imaging software that operates the graphic image application system is Meteor Software obtained from The Technology Partnership, Plc., of Melbourn, Hertfordshire, United Kingdom. However, other suitable imaging software may also be used. The imaging software for the graphic image application system controls the configuration; if the print heads and peripheral input/output. It splits the print data into streams of data for each print head and it buffers the print data. It synchronizes a large array of print heads, handles encoder signals and home/product detect signals, and handles repeated fixed images and variable images and overlays of variable data onto fixed background images. In addition, the imaging software for the graphic image application system takes into account multiple swaths and the relative position of the image. It rotates the image so that the application does not come out skewed. It also tracks which parts of the image have been printed and informs the operator of the areas left to be covered or printed.

In another embodiment of the invention, there is provided a method of applying and accurately positioning at least one graphic image on a large contoured surface. The method comprises the step of connecting a flexible-rail positioning system with an attached paint or graphic image application system to a portion of the surface to be painted or decorated. The flexible-rail positioning system 22 is secured or attached to the curved surface 20 with the attachment components 34 on the rails 36, 38.

The method further comprises the step of identifying reference or alignment marks on the portion of the surface to be painted or decorated. The imaging software that operates the paint or graphic image application system has the capability of scanning patterns that are already in place and then readjusting the patterns so that they blend together or match. The paint or graphic image application system uses a camera system for fiducial detection of the reference or alignment marks.

The method further comprises the step of aligning the paint or graphic image application system to the reference or alignment marks on the portion of the surface to be painted or decorated. The imaging software that operates the paint or graphic image application system scans, matches and identifies reference or alignment marks and then the flexible-rail positioning system aligns the paint application system to the reference marks.

The method further comprises aligning a selected segment of the graphic image to be applied to the reference marks on the portion of the surface to be painted or decorated. The image may be aligned by either tracking the position of the graphic image application system in three-dimensional space and calculating the relative position to a known fiducial, or positioning the new image based on the old image position. The paint or graphic image application device can print a rectangular tile along with the reference or alignment marks to which the next tile is aligned. It does this by rastering the print heads 48 back and forth as they apply swaths of ink or paint. After each swath is applied, the paint or graphic image application device 46 is indexed or moved one swath-width along the rails 36, 38 of the flexible-rail positioning system 22. These swaths add up to form the image tile similar to lines in a television picture. The greater the swath width, the less time required to print an image tile, and the greater the image application system weight. Swath width is preferably optimized to minimize both system weight and tile application time. Preferably, the graphic image is applied in a swath size chosen to minimize application system weight while maximizing area coverage rate. In this manner printed tiles of graphics can be accurately positioned so as to form a mosaicked image that can cover up to 80% of the decorative surface of the aircraft. Unlike a system consisting of a graphics application device in the form of an x-y-z gantry positioning system, aircraft surfaces with significant cylindrical curvature can be decorated, thus improving the utility of the graphics application device. Unlike a system consisting of the graphics application device and a multi-axis robotic arm, the invention's weight is compatible with movable platforms of the type installed in paint hangars associated with aircraft.

The method further comprises the step of applying the selected segment of the graphic image by moving the paint or graphic image application system along the portion of the surface to be painted or decorated using flexible rails 36, 38. The surface of the object being painted or decorated is stationary and the paint or graphic image application system is moved over the object via a flexible-rail positioning system, such as the positioning system described above. The method further comprises the step of detaching the flexible-rail positioning system after the graphic image is applied, and moving the flexible-rail positioning system to another portion of the surface. The width of the area to be covered with the method and apparatus of the invention is preferably from about 5 feet wide to about 6 feet wide, with the width being defined as the separation between the rails. The length of the area to be covered is preferably defined by how long the rails are on the flexible-rail positioning system. Preferably, the paint or graphic image application system can apply a durable ink and/or paint to the surface. Preferably, the durable ink or paint used is ultraviolet curable. Ultraviolet curable ink or paint is preferred due to its superior chemical resistance, adhesion, and durability. In addition, a full four-color digitalized image may be applied. Preferably, the graphic image is applied in a swath size chosen to minimize application system weight while maximizing area coverage rate.

In another embodiment of the invention, there is provided a method of accurately applying and positioning a graphic image on an exterior surface of an aircraft, comprising the steps of: connecting a flexible-rail positioning system with an attached graphic image application system to a portion of the surface; identifying reference marks on the portion of the surface; aligning the graphic image application system to the reference marks on the portion of the surface; aligning a selected segment of the graphic image to be applied to the reference marks on the portion of the surface; applying the selected segment of the graphic image by moving the graphic image application system along the portion of the surface using the flexible-rail positioning system, and, detaching the flexible-rail positioning system after the graphic image is applied, and moving the flexible-rail positioning system to another portion of the surface.

With the method and apparatus of the invention, a graphics application rate of between 50 square feet per hour per person to about 75 square feet per hour per person (assuming two people are operating the system), with very fast curing during application and no masking/de-masking/re-masking is achievable. At this rate the entire decorative area of, for example, a Boeing 737 commercial airplane may be decorated or painted in one shift using four systems (one per paint platform). In addition, for a typical graphics application scenario, the estimated time to set up the apparatus for positioning on the contoured surface is approximately 11 minutes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of applying and accurately positioning at least one graphic image on a large contoured surface, comprising the steps of:

connecting a flexible-rail positioning system with an attached paint application system that uses ultraviolet curable paints to a portion of the surface to be painted, the paint application system being controlled by an imaging software program;

identifying reference marks on the portion of the surface to be painted;

aligning the paint application system to the reference marks on the portion of the surface to be painted;

aligning a selected segment of the graphic image to be applied to the reference marks on the portion of the surface to be painted;

applying the selected segment of the graphic image by moving the paint application system along the portion of the surface to be painted using a flexible rail; and, detaching the flexible-rail positioning system after the selected segment of the graphic image is applied, and moving the flexible-rail positioning system to another portion of the surface to apply a new selected segment of the graphic image, wherein the imaging software program tracks the selected segments already applied and positions new selected segments based on the selected segments already applied to form a mosaicked graphic image on the surface to be painted.

2. The method of claim 1 wherein the ultraviolet curable paints provide chemical resistance, adhesion, durability, and allowance of a full four-color digitalized image to be applied to the surface to be painted.

3. The method of claim 1 wherein the imaging software program rotates the graphic image so that application of the graphic image is not skewed.

4. The method of claim 1 wherein the graphic image is applied to a surface of an aircraft.

5. The method of claim 1 wherein the graphic image is applied to the surface at an application rate of at least 50 square feet per hour per operator, with two operators operating the paint application system.

6. The method of claim 1 wherein a width of single area of the surface to be painted or decorated in one application is from about 5 feet wide to about 6 feet wide.

7. The method of claim 1 wherein the method does not require masking, de-masking, or re-masking and has very fast curing.

8. A method of accurately applying and positioning a graphic image on an exterior surface of an aircraft, comprising the steps of:

connecting a flexible-rail positioning system with an attached graphic image application system to a portion of the surface, the graphic image application system comprising an ink jet printer that uses ultraviolet curable inks and the graphic image application system being controlled by an imaging software program;

identifying reference marks on the portion of the surface;

aligning the graphic image application system to the reference marks on the portion of the surface;

aligning a selected segment of the graphic image to be applied to the reference marks on the portion of the surface;

applying the selected segment of the graphic image by moving the graphic image application system along the portion of the surface using the flexible-rail positioning system; and, detaching the flexible-rail positioning system after the selected segment of the graphic image is applied, and moving the flexible-rail positioning system to another portion of the surface to apply a new selected segment of the graphic image, wherein the imaging software program tracks the selected segments already applied and positions new selected segments based on the selected segments already applied to form a mosaicked graphic image on the surface.

9. The method of claim 8 wherein the exterior surface of the aircraft comprises an aircraft fuselage.

10. The method of claim 8 wherein the ultraviolet curable inks provide chemical resistance, adhesion, durability, and allowance of a full four-color digitalized image to be applied to the portion of the surface.

11. The method of claim 8 wherein the imaging software program rotates the graphic image so that application of the graphic image is not skewed.

12. The method of claim 8 wherein the imaging software program tracks which selected segments of the graphic image have been applied and informs an operator of portions of the surface left to which the graphic image is to be applied.

13. The method of claim 8 wherein the ink jet printer further comprises a plurality of print heads, ink tanks, an ultraviolet cure lamp, a camera system for fiducial detection, and brushes.

14. The method of claim 8 wherein the selected segments of the graphic image are aligned by tracking a position of the graphic image application system in three-dimensional space and calculating a relative position of a known fiducial.

15. A method of applying and accurately positioning at least one graphic image on a large contoured surface, comprising the steps of:

connecting a flexible-rail positioning system with an attached paint application system that uses ultraviolet curable paints to a portion of the surface, wherein the system uses ultraviolet curable paints or inks;

using an imaging software program to scan, match, and identify reference marks on the portion of the surface to align the paint application system to the reference marks;

using a camera system for fiducial detection of the reference marks to align a selected segment of the graphic image to be applied to the reference marks;

applying the selected segment of the graphic image by moving the paint application system along the portion of the surface using a flexible rail; and, detaching the flexible-rail positioning system after the selected segment of the graphic image is applied, and moving the flexible-rail positioning system to another portion of the surface to apply a new selected segment of the graphic image, such that the selected segments are accurately positioned to form a mosaicked graphic image on the surface.

16. The method of claim 15 wherein each selected segment of the graphic image is aligned to the reference marks by tracking a position of the paint application system in three-dimensional space and calculating a relative position to a known fiducial.

17. The method of claim 15 wherein the imaging software program scans the selected segments already applied and readjusts the selected segments so that the selected segments blend together.

18. The method of claim 15 wherein the graphic image is applied in a swath size chosen to minimize application system weight while maximizing area coverage rate.

19. The method of claim 15 wherein the graphic image is applied to a surface of an aircraft.

20. The method of claim 19 wherein the selected segments are accurately positioned to form the mosaicked graphic image that can cover up to 80% of a decorative surface of the aircraft.

21. The method of claim 15 wherein the paint application system comprises an ink jet printer.

22. The method of claim 15 wherein the method does not require masking, de-masking, or re-masking and has very fast curing.

* * * * *